United States Patent [19]

Wells et al.

[11] Patent Number: 5,023,905

[45] Date of Patent: Jun. 11, 1991

[54] POCKET DATA RECEIVER WITH FULL PAGE VISUAL DISPLAY

[75] Inventors: Benjamin A. Wells, Newton; Neil Golden, Sharon, both of Mass.

[73] Assignee: Reflection Technology, Inc., Waltham, Mass.

[21] Appl. No.: 223,833

[22] Filed: Jul. 25, 1988

[51] Int. Cl.⁵ .......................................... H04M 11/00
[52] U.S. Cl. ...................................... 379/96; 379/110; 340/825.4
[58] Field of Search .................... 379/53, 54, 96, 110, 379/433; 358/85; 340/311.1, 825.44, 825.48

[56] References Cited

U.S. PATENT DOCUMENTS

| Re. 28,847 | 6/1976 | Vizenor. | |
|---|---|---|---|
| Re. 32,365 | 3/1987 | Sebestyen | 340/311.1 |
| D. 295,411 | 4/1988 | Cho et al. | 379/433 |
| 1,756,232 | 4/1930 | Arnaud | 358/208 |
| 1,766,885 | 6/1930 | Dauvillier | 358/208 |
| 1,979,296 | 11/1934 | Sweeney | 358/208 |
| 2,681,588 | 6/1954 | Dyner. | |
| 3,059,519 | 10/1962 | Stanton. | |
| 3,079,555 | 2/1963 | Daschke. | |
| 3,170,979 | 2/1965 | Baldwin et al. | 340/705 |
| 3,205,303 | 9/1965 | Bradley. | |
| 3,446,980 | 5/1969 | Meier | 250/234 |
| 3,532,408 | 10/1970 | Dostal | 350/486 |
| 3,609,485 | 9/1971 | Dostal. | |
| 3,671,766 | 6/1972 | Howe. | |
| 3,742,238 | 6/1973 | Hoffman, II. | |
| 3,760,181 | 9/1973 | Daly et al. | 250/332 |
| 3,781,559 | 12/1973 | Cooper et al. | |
| 3,833,300 | 9/1974 | Rymes. | |
| 3,846,784 | 11/1974 | Sinclair | 340/814 |
| 3,923,370 | 12/1975 | Mostrom. | |
| 3,958,235 | 5/1976 | Duffy. | |
| 4,026,641 | 5/1977 | Bosserman et al. | |
| 4,081,209 | 3/1978 | Heller et al. | |
| 4,225,862 | 9/1980 | Johnson | 340/755 |
| 4,232,196 | 11/1980 | Filippi. | |
| 4,248,495 | 2/1981 | Minoura. | |
| 4,251,126 | 2/1981 | Minoura et al. | 350/6.6 |
| 4,268,721 | 5/1981 | Nielson et al. | 379/96 X |
| 4,311,999 | 1/1982 | Upton et al. | 340/755 |
| 4,340,888 | 7/1982 | Seroskie | 340/755 |
| 4,364,636 | 12/1982 | Ellis | 350/174 |
| 4,415,065 | 11/1983 | Sandstedt | 340/825.44 |
| 4,439,157 | 3/1984 | Breglia et al. | 350/174 X |
| 4,442,318 | 4/1984 | Desrochers | 379/96 |
| 4,443,075 | 4/1984 | Crane | 351/209 |

(List continued on next page.)

FOREIGN PATENT DOCUMENTS

| 0121927 | 10/1984 | European Pat. Off.. | |
|---|---|---|---|
| 301801 | 2/1989 | European Pat. Off. | 379/53 |
| 56-30677 | 3/1981 | Japan | 340/781 |
| 57-114116 | 7/1982 | Japan | 350/6.6 |
| 8606238 | 10/1986 | PCT Int'l Appl.. | |

OTHER PUBLICATIONS

Reid, D. A. T., "Micro-Display," 6/79, IBM Technical Disclosure Bulletin, vol. 22, No. 1, p. 362.
Upton, Hubert W. and Goodman, James R., "Eyeglass Heads-Up Display," SID 81 Digest, pp. 48, 49.

(List continued on next page.)

Primary Examiner—Jin F. Ng
Assistant Examiner—Wing F. Chan
Attorney, Agent, or Firm—Wolf, Greenfield & Sacks

[57] ABSTRACT

A pocket-sized data receiver which is capable of displaying a full, 80 column page of data includes a virtual raster display unit, and electronic circuitry for receiving data by means of radio transmission or conventional telephone lines, processing the data into a viewable format, storing the data, displaying the data on the raster display unit, and in the case of reception of data over telephone lines, retransmitting of the data to another device over telephone lines. A keyboard connectd to a processing unit enables the viewer to enter dialing information, select data for viewing, and control the selection and operation of the data receiver. The data receiver can be held and operated with one hand, and requires only one eye for viewing, thereby leaving the other eye unobstructed.

21 Claims, 5 Drawing Sheets

U.S. PATENT DOCUMENTS

| | | |
|---|---|---|
| 4,457,580 | 7/1984 | Klose .................................... 350/6.91 |
| 4,470,044 | 9/1984 | Bell ......................................... 340/755 |
| 4,538,181 | 8/1985 | Taylor . |
| 4,618,860 | 10/1986 | Mori ................................. 340/825.44 |
| 4,632,501 | 12/1986 | Glynn ..................................... 350/6.6 |
| 4,636,866 | 1/1987 | Hattori et al. .................. 340/705 X |
| 4,661,659 | 4/1987 | Nishimura ............................. 379/99 |
| 4,676,582 | 6/1987 | Kato et al. ............................ 350/65 |
| 4,708,420 | 11/1987 | Liddiard ............................... 350/6.6 |
| 4,720,781 | 1/1988 | Crossland et al. ............. 340/825.35 |
| 4,732,440 | 3/1988 | Gadhok ................................. 350/6.6 |
| 4,752,129 | 6/1988 | Izumi et al. ........................ 356/328 |
| 4,753,514 | 6/1988 | Kubik .................................. 350/174 |
| 4,795,223 | 1/1989 | Moss ................................. 353/14 X |
| 4,837,811 | 6/1989 | Butler et al. .......................... 379/96 |

OTHER PUBLICATIONS

Upton, Hubert W. and Goodman, J. R., "Eyeglass Heads-Up Display," Proceedings of the SID, vol. 23/2, 1982, pp. 77–80.

Title "IRTV-445 Patented Scanning System", Inframetrics Night Vision Systems Group, Bedford, MA.

Invention Disclosure, Fritzel, et al., "I.D.C. Reactionless Mirror Drive Concept", Hughes Aircraft Company, May 1975.

OKI Technical Review 123, vol. 52, publication "High-Resolution Display Using Light-Emitting Diode Arrays," Abiko, et al., 1/86, pp. 46–50.

Invention Disclosure, "Beam Stabilization and Auto Alignment System," Hughes Aircraft Company, 9/76, Report No. P76-361.

"Conversational Terminal," Cermetek Microelectronics, 4/87.

"Lifestyle Personal Communicator," AdioBionics Inc., Hearing Instruments, vol. 36, No. 1, 1985.

Machine Design, 6/12/86, "Lineman's Handset Answers All Question," p. 46.

Leon, N. M., "Projectd Image Display," 6/79, IBM Technical Disclosure Bulletin, vol. 22, No. 1, pp. 363–365.

POCKET DATA RECEIVER WITH FULL PAGE VISUAL DISPLAY

FIELD OF THE INVENTION

The present invention relates to the field of portable data receiving devices and, in particular, to a hand-held data receiver which incorporates a miniature full page video display system.

BACKGROUND OF THE INVENTION

There are a number of pocket sized data receivers in existence, including radio pagers and financial information radios, which are capable of visually displaying information. For example, U.S. Pat. Nos. 4,336,542; 4,696,054; and 4,197,526 all disclose pager/receiver devices in which some form of information is visually displayed. Most of the above-listed devices use a single row output display which contain a limited number of matrices adapted for displaying alphanumeric characters. Such matrices are typically made up of light emitting diodes, liquid crystals. or similar elements. Unfortunately, such displays provide only a few characters of information at a time and have low resolution which is incapable of displaying graphics. Furthermore, if liquid crystal elements are utilized in the display, viewing is difficult, particularly in low ambient light conditions.

PCT application PCT/GB86/00213 (pub. No. WO86/06238), Eggleden et al discloses a text receiver which is capable of displaying a 40 column page of information by means of a liquid crystal display consisting of a matrix of energizable picture elements Although the Eggleden device is capable of displaying more information than the previously mentioned devices, the flat screen liquid crystal display does not have particularly high resolution and is not suited for even elementary graphics. Also, as mentioned above, LCD screens are difficult to view in low ambient light conditions. Furthermore, the flat LCD screen required to enable the full page display limits the minimum size of the device to approximately that of a large pocket calculator or average-size paper-back book.

Although the Eggleden device discloses a text receiver which is capable of receiving data by radio transmission, storing data for later retrieval, and displaying a full page of information, there are many desirable features which are absent. For instance, it is desirable to have a full page display which is capable of high resolution graphics and is viewable in all ambient light conditions. Also, a text receiver which is capable of receiving, processing or unscrambling, storing, and retransmitting data in a variety of different formats is highly desirable.

Accordingly, there is a need for an improved data receiver which allows the user to receive or transmit data in a variety of ways, store data for later viewing, process or unscramble data into a viewable format, and view high resolution full page display in all ambient light conditions.

It is therefore an object of the present invention to provide a data receiver that is more versatile than existing receivers and overcomes problems of the prior art devices.

A further object of the present invention is to provide a data receiver that allows the viewing of an 80-column page composed of large, easily readable characters but is physically smaller than the size of the page.

A further object of the present invention is to provide a data receiver that is capable of receiving data by radio transmission, including direct transmission, subcarrier transmission and transmission of data in TV retrace intervals, and/or telephone transmissions, including data encoded into binary data, text, or scanned graphics.

Yet another object of the present invention is to provide a data receiver with data processing capabilities to allow unscrambling or decoding of information with a user supplied password, allowing reception of personal information or paid subscription information as well as to allow displaying or selecting of only desired information from the input data stream or stored data.

Still another object of the present invention is to provide a data receiver which is capable of transmitting stored data to a printer or a computer.

It is a final object of the present invention to provide a data receiver with a full page display which is capable of high resolution graphics and is viewable in all ambient light conditions.

BRIEF SUMMARY OF THE INVENTION

The foregoing and other objects of the present invention are achieved with a portable, pocket-sized data receiver which is capable of receiving transmitting and processing data as well as displaying a full page of data with high resolution in all ambient light conditions.

According to one embodiment of the present invention, a portable data receiver is provided comprised of a virtual raster display, electronic circuitry for receiving, storing, processing and retransmitting data, a keyboard, and a housing or case.

The raster display of the present invention is an electromechanical scanning system in which a line of light emitting devices is modulated with the information to be displayed. An optical system creates an enlarged virtual image of the light emitting elements. The illuminated line is converted into a raster by means of an oscillating mirror thereby generating a virtual raster image. This design has the advantage that the full "page" display can be created from a much smaller number of light emitting devices than is necessary to generate a normal full page real image.

The electronic circuitry associated with the display is comprised of a frame buffer memory and display control unit. The frame buffer is comprised of enough random access memory to store one or more frames of data to be displayed. The display control unit is comprised of timing and control logic, mirror drive circuitry, scan delay logic, shift registers and latches. The frame buffer memory and display control unit are connected to the other elements of the present embodiment by an eight-bit data bus.

A data storage device comprised of RAM is further attached to the data bus for storing multiple pages of received data for later viewing.

The circuitry for receiving and retransmitting data is comprised of a data access arrangement (DAA) connected in series with a standard RJ11 telephone modular connector and a modem. The DAA device is a conventional circuit which is generally required by regulatory agencies in order to connect a device directly to the telephone line.

The modem provides modulator/demodulator functions, serial-to-parallel data format conversion and telephone dialing capabilities necessary for making a telephone connection to a remote data source. The logic elements including the modem are connected together by a conventional microprocessor data bus.

A microprocessor in conjunction with a ROM storage device provides the ability to process, and control the display of, the received data. The ROM storage device contains pre-programmed micro routines which, when executed by the microprocessor, allow selection and processing of data and receiving and retransmitting data. Both the ROM storage device and the microprocessor are attached to the microprocessor data bus so that information and data may be passed between them.

A keyboard is provided for turning on power to the unit, controlling the display, and entering dialing information. The keyboard is connected directly to an input/output (I/O) port of the microprocessor. The microprocessor can also interpret and execute program commands entered directly on the keyboard by the user.

The housing or casing of the present embodiment varies according to the physical arrangement of the electronic components and the raster display. The rectangular raster display system may be positioned vertically, horizontally, or at an angle along the side of the unit. Also, the keys comprising the keyboard may be positioned on the top, sides or back of the unit, as can the connectors to the data access arrangement. These varying case designs will be exemplified later.

One embodiment of the present invention enables a user to connect the data receiver to a conventional telephone jack. By means of the keyboard and by means of the dialing facilities within the modem, the user may access remote data sources over conventional telephone lines. By means of the keyboard, the user may also interact with the remote data source and request, view, or store data.

In a second embodiment of the present invention, the conventional modem is replaced by a specialized FAX modem which is connected to the 8-bit data bus. In this embodiment, the user is able to receive or send FAX messages, in which graphical data is sent in compressed format over conventional phone lines. The user is able to uncompress the data, view the scanned picture and retransmit the compressed data to another FAX compatible device over conventional phone lines. The other elements of the second embodiment are arranged and structured similar to first embodiment of the present invention. Likewise, the physical arrangement of the raster display and keyboard as well as the case design may vary as exemplified later.

In a third embodiment of the present invention, the telephone jack connector, data access arrangement, and modem of the first embodiment are replaced by an antenna, radio receiver, demodulator, and a serial-to parallel converter. In this illustrative embodiment, the radio receiver allows reception of serial, frequency-shift keyed (FSK) modulated data. During processing, the data is converted from serial format to parallel format by a universal asynchronous receiver transmitter (UART) for later unscrambling, processing, viewing or storage. Although, in this embodiment the user is able to receive data transmitted by radio transmission, retransmission of data is not possible. The other elements of the third embodiment ar arranged and structured similar to first embodiment of the present invention. Likewise, the physical arrangement of the raster display and keyboard as well as the case design may vary as exemplified later.

The invention will be more fully understood from the detailed description set forth below, which should be read in conjunction with the accompanying drawings. The invention is defined in the claims appended at the end of the detailed description, which is offered by way of example only.

DETAILED DESCRIPTION

Figure 1:
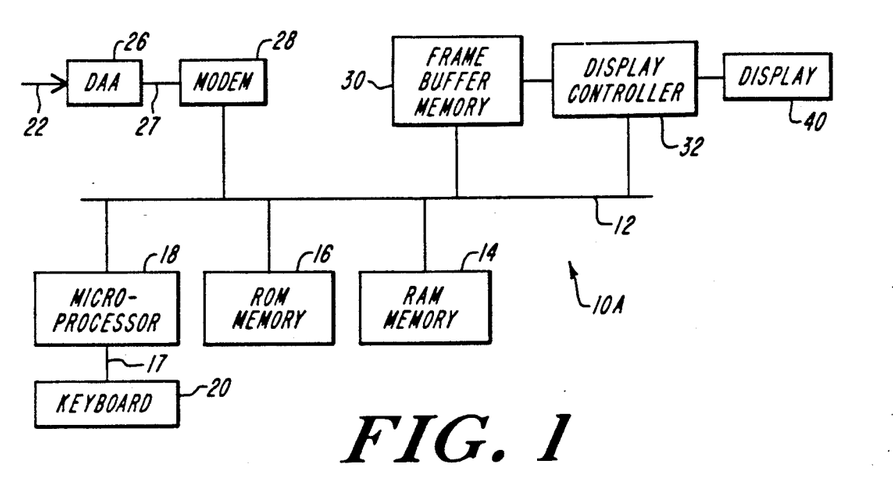
FIG. 1 is a schematic block diagram of a first embodiment of the present invention illustrating the electronic elements necessary to receive, store, process, display and transmit text or binary data over ordinary telephone lines.

FIG. 1 is a block electrical schematic diagram of an illustrative embodiment of the data receiver circuitry which enables the data receiver to receive, store, process and retransmit data. In accordance with the invention, an entire page of data information may be displayed at once on the illustrative scanning display.

The data receiver 10A shown in FIG. 1 can be used with available conventional telehone lines. The data receiver 10A is connected to a conventional telephone jack by connector 22. Connector 22 is a conventional RJ11-type modular connector which is compatible with most modern telephone jacks. Connector 22 is connected to data access arrangement (DAA) 26.

Device 26 is a conventional hybrid circuit which is required by regulatory agencies to provide a connection to telephone lines and its construction is well-known. A DAA device suitable for use in the present invention is Cermetek model 1810A available from Cermetek, Inc., 1388 Borregas Avenue, Sunnyvale, Calif. 94088. The output of DAA 26 is provided, via signal path 27, to a modem. Although the signal path 27 is shown as a single wire, it would, in fact, consist of two or more wires in order to carry the analog signals produced by DAA device 26.

Modem 28 is a conventional modulator/demodulator circuit with serial to parallel conversion capability. Modem 28 converts the analog signal produced DAA device 26 to digital data representing both data to be displayed on display unit 40 and control signals which are used by microprocessor 18 in order to format the data on display unit 40. Modem 28 further provides dialing capabilities thereby enabling the user to access data sources or to retransmit previously received data over conventional telephone lines. Microprocessor 18 provides dialing control information to modem 28 over a conventional data bus 12. A modem suitable for use in the present invention is commercially available in a single integrated circuit package, Silicon Systems model K224, available from Silicon Systems, 14351 Myford Road, Tustin, Calif. 92680.

As mentioned above, a central microprocessor bus 12 serves as both an address and data bus to interconnect the major components of data receiver 10A.

Also connected to the bus 12 is a read only memory (ROM) 16. ROM memory 16 contains microprograms which are used to control the execution sequences of microprocessor 18. The programs stored in ROM memory 16 consist of execution routines which enable receiving, storing, processing, displaying, and retransmitting of data by data receiver 10A. The construction and programming of a ROM memory is conventional and will not be repeated here for clarity. A ROM memory storage device suitable for use in the present invention is the Hitachi HM61364 memory device available from Hitachi America Ltd., 2210 O'Toole Avenue, San Jose 95131. Alternately, since the ROM memory 16 works in close conjunction with microprocessor 18, the ROM memory and microprocessor can be incorporated into a single processor chip.

A random access memory (RAM) 14 is further connected to bus 12. The data information received from modem 28 as well as control information generated by microprocessor 18 are stored in RAM memory 15. The size of RAM memory 14 may vary according to the number of desired documents or pages to be stored. A small quantity of RAM memory may be used to store only few pages and maybe upwardly expanded to store more pages. In the preferred embodiment of the present invention, a low power CMOS RAM memory is used thereby enabling retention of the memory contents with a low power drain when the rest of the data receiver 10A is powered down. A low powered CMOS RAM memory suitable for use in the present invention is also commercially available as Hitachi HM6264 RAM memory available from Hitachi America Ltd.

Microprocessor 18 is connected to modem 28, ROM memory 16, RAM memory 14, frame buffer memory 30, and display controller unit 32 via bus 12. Microprocessor 18 receives input commands from keyboard 20, serves as bus controller for bus 12 interrconnecting the major elements of device 10A, and executes microprograms stored in ROM memory 16 which enable the processes of receiving, storing, processing, displaying and retransmitting data by data receiver 10A. The instruction operation of microprocessor 18 in conjunction with ROM memory 16 and RAM memory 14 is well known and will not be described in detail hereinafter. A microprocessor suitable for the present invention is available commercially as Intel 8048 microprocessor chip from Intel Corp., 3065 Bowers Avenue, Santa Clara, Calif. 95051. Other miscellaneous hardware associated with the microprocessor such as a crystal oscillator, is not shown in FIG. 1 and is well-known and will not be described hereinafter.

The I/O port of microprocessor 18 is connected directly to keyboard 20 by signal path 17. Although shown as a single wire in FIG. 1, there are a plurality of control lines extending from keyboard 20, the actual number of which depends on the number of keys contained in keyboard 20. The interfacing of an alphanumeric keyboard with a microprocessor is well-known and will not be repeated here for brevity.

In the present embodiment, keyboard 20 may be comprised of a conventional 12-button keypad containing ten "digit" designations and two command buttons. The command buttons allow the selection of a "dialing" mode or a "command" mode. In the command mode, each of the ten "digit" buttons on the keypad takes on a secondary function in addition to the normal digit representation thereby allowing the user to control data receiver 10A. Alternately, a smaller number of functional buttons, including directional buttons for moving a cursor in four directions may be provided to allow dialing control and other display commands to be selected from a menu on the display. A power switch (not shown) for applying power to the system may or may not be included as part of the keyboard 20.

The power to display receiver 10A is supplied by a conventional battery power circuit, not shown in FIG. 1. Such a power supply is well known and will not be described further in detail. As shown in FIG. 1, display 40 is connected to display controller 32 which is in turn connected to frame buffer memory 30. Both frame buffer memory 30 and display controller 32 are connected to bus 12.

Figure 4:
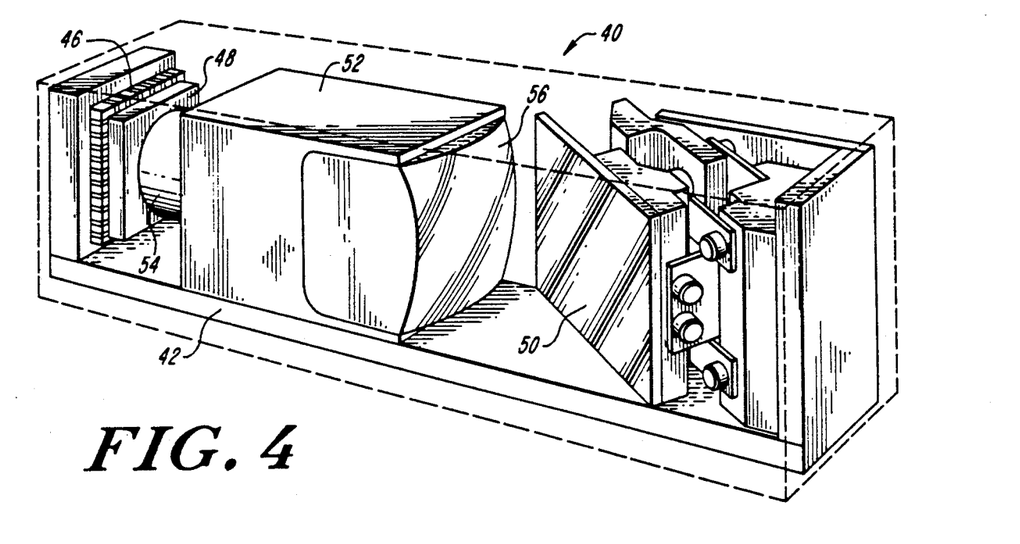
FIG. 4 is a perspective view of the miniature video display system of the present invention used to generate the full page virtual raster display.

FIG. 4 shows an illustrative embodiment of a miniature display device which is used, preferably, for raster display 40 of data receiver 10A. The miniature display is of the type described in detail in co-pending U.S. patent application entitled *Miniature Video Display System*, filed on July 27, 1987, under Ser. No. 078,295 and assigned to the same assignee as the present invention (now U.S. Pat. No. 4,934,773) and co-pending U.S. patent application entitled *Low Vibration Resonant Scanning Unit for Miniature Optical Display Apparatus* filed on May 31, 1988 under Ser. No. 200,645 and assigned to the same assignee as the present invention (now U.S. Pat. No. 4,902,083). The operation and construction of the display device is discussed in detail in those applications, both of which are hereby incorporated by reference, and will not be repeated in detail herein for clarity. The display 40 consists of a base 42 on which the various optical components which comprise the display are mounted. At one end of base 42 is mounted the header block 44 in which an array of light-emitting devices 46 (such as light emitting diodes) is attached. Generally, such an array may be a linear array comprising two rows of devices which ar staggered in order to compensate for gaps between the devices. The devices are covered by a clear cover plate 48.

Light emitted from devices 46 is projected via mirror 50 by means of an optical system which consists of housing 52 in which are mounted lenses 54 and 56. In accordance with the principles set forth in the aforementioned U.S. patent application Ser. No. 078,295 (now U.S. Pat. No. 4,934,773), the lens system projects the enlarged virtual image of array 46 via mirror 50.

As described in the above-described patent applications, mirror 50 is oscillated by an electromechanical drive motor (not shown). The oscillation of mirror 50, in turn, creates a raster image from linear array 46.

Under control of microprocessor 18, data stored in RAM memory 14 is transferred to frame buffer 30. Frame buffer 30 continuously transfers the data to display controller 32 which presents the data to display 40 for displaying. The operation of frame buffer 30 and display controller 32 are described in detail in the aforementioned patent application Ser. No. 078,295 and will not be discussed further in detail.

A data receiver 10A constructed according to the present embodiment connects to a standard telephone jack via a cable and is capable of receiving, storing, processing, displaying and retransmitting data in binary encoded forms. The operation of data receiver 10A generally works as follows.

The user of data receiver 10A depresses the power switch causing electrical power to be supplied to all major components of the system. The user then specifies through keyboard 20 what operation he or she desires. Microprocessor 18 then retrieves and executes the desired microprogram for the selected operation. If a display command is indicated, data stored in RAM memory 14 will be sent to frame buffer 30 under the control of microprocessor 18 via bus 12. Additional control information will be sent from microprocessor 18 to display controller 32 which will control display 40 for the appropriate display of the data. If a processing command is indicated, the microprocessor 18 will perform some operation on the data prior its sending to the frame buffer 30, such as decompressing of compressed data.

If a receive command is indicated, microprocessor 18 receives dialing information entered on keyboard 20 by the user. Microprocessor 18 then forwards the appropriate control information to modem 28 which in turn sends the appropriate control signals to DAA device 26. DAA device 26 sends the appropriate control signals out over the phone network for connection to the specified source. Assuming a proper connection, the appropriate control and data signals are transferred over the telephone lines to DAA device 26 and over signal path 27 to modem 28. Modem 28 converts the analog signals produced by DAA device 26 to digital signals representing data to be displayed and control signals which are used by microprocessor 18 to store the digital data in RAM memory 14.

A transmission command signified by the user would be executed in a similar manner except once the DAA device 26 made connection with the appropriately dialed device, data would be transferred from RAM memory 14, under the control of microprocessor 18, to modem 28, and onto DAA device 26 and the appropriate receiving device in the telephone network.

A device 10A constructed according to the preferred embodiment described previously enables a user to access any kind of information which can be transmitted over conventional phone lines, view that information in a full page format, interact with the information source, and then save or retransmit that data to another device.

Figure 2:
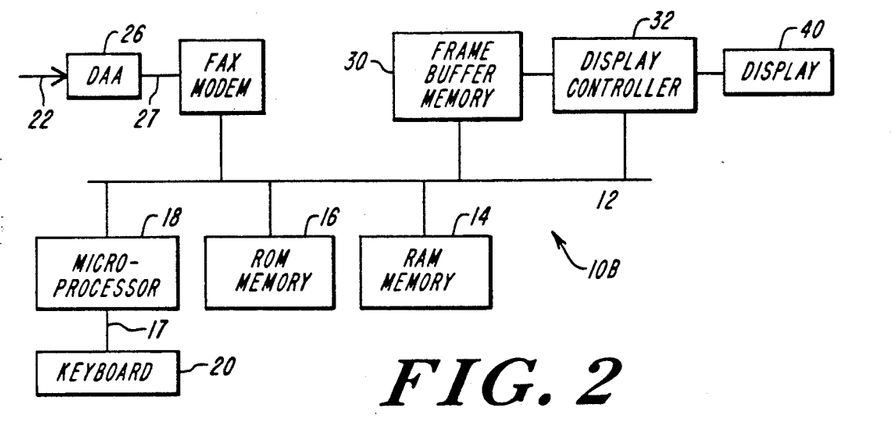
FIG. 2 is a schematic block diagram of a second embodiment of the present invention illustrating the electronic elements necessary to receive, store, process and display and transmit facsimile data representing scanned pictures over telephone lines.

Referring now to FIG. 2, a second embodiment of the present invention is shown in data receiver 10B, which is designed specifically for receiving, viewing and retransmission of data from FAX machine over the telephone network. The data receiver 10B, which is specialized for connection to other FAX machines, is identical to data receiver 10A, in structure and function except that modem 28 has been replaced with special customized FAX modem 24 as shown in FIG. 2.

In a FAX network, documents, pictures or other visual information are transmitted in the form of a compressed bit map, requiring a specialized modem and control software for interpretation of analog signals from DAA device 26. A FAX modem which is suitable for use in the present invention is commercially available on a single integrated circuit device from Rockwell International Corportion, model R48MFX.

The operations for receiving, transmitting, storing and displaying of information by data receiver 10B are similar to that of data receiver 10A except that long documents are stored in RAM memory 14 in a compressed mode. When a display command is signified by the user, microprocessor 18 uncompresses the data stored in RAM memory 14 prior to sending it to frame buffer 30 and the other elements of the display unit for viewing by the user.

A data receiver constructed according to data receiver 10B is capable of receiving, displaying, and retransmitting complex graphics and other visual information, displaying them in a full page format to the user, and retransmitting the same data to another FAX device over conventional telphone lines.

Figure 3:
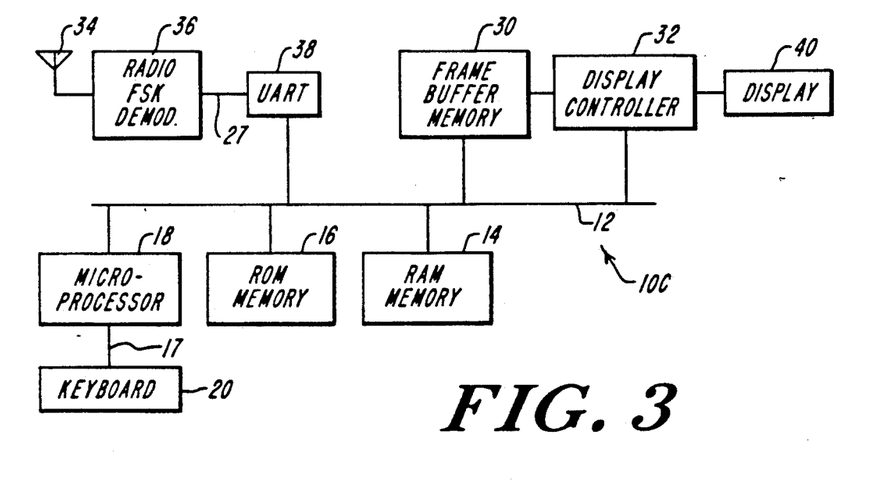
FIG. 3 is a schematic block diagram of a third embodiment of the present invention illustrating the electronic elements necessary to receive, store, process and display radio transmission data.

Referring now to FIG. 3, a third embodiment of the present invention is shown by the electrical schematic block diagram representing data recevier 10C. Data receiver 10C is designed for a radio pager application. The specific design of data receiver 10C depends on the type of broadcast and desired reception. The varying types of radio transmissions for which the design of data receiver 10C can be tailored include direct reception as in a radio pager, reception of financial information on a sub carrier of a public radio station as in Lotus Information Network, financial information, or reception of Teletex transmissions.

The design of data receiver 10C is similar in structure and function to data receivers 10A and 10B except that connector 22, DAA device 26, and modem 24 have been replaced by a conventional antenna 34, a radio receiver incorporating a frequency-shift-keyed (FSK) demodulator, and a serial-to parallel converter.

The construction of the radio receiver incorporating a FSK demodulator and is its connection with antenna 34 are well known and will not be described in further detail. A radio receiver which is suitable for use in the present invention is available commerically as a single integrated-circuit radio receiver available from Motorola Semiconductor Products Corporation, Phoenix, Ariz., part number MC3356. The tuning means and associated support circuitry, not shown in FIG. 3, required to operate the radio receiver are well known and will also not be described here in further detail.

The analog signals produced by the radio receiver 36 are transferred to a serial to parallel converter via signal path 37. In an illustrative embodiment, a UART is used for the conversion process. UART 38 converts the stream of binary data signals produced by radio receiver 36 into bytes of digital data for transmission over bus 12 to RAM memory 14. UART 38 converts incoming asynchronous data bits into standard data signals according to the RS-232 standard. A UART suitable for use in the illustrative embodiment is available from GE/Intersil incorporated as part number IM6402.

A data receiver constructed in the manner of receiver 10C is capable of receiving, storing, and displaying data in full page format without requiring physical connection to any network or other device, allowing for maximum mobility when using the device, but radio retransmission of stored or received data is not possible.

Having described three different embodiments of the electronic and logic components comprising the data receiver 10, a description of the actual physical arrrangement and housing or case of the unit follows.

One of the primary advantages of data receivers 10A-C is that the user is able to view a full, 80-column page of data with a receiver which is physically smaller than the size of a normal page. In particular, the raster image which is generated by the devices has the appearance of a 6"×9⅜" page viewed from 24 inches away. The compact, pocket size of data receiver 10 not only allows for true portability, but the physical shape and positioning of the viewing window enables viewing of the data with only one eye, leaving the vision of the other eye unobstructed. FIGS. 5-9 illustrate various designs for the casing and viewing positioning of data receiver 10.

Figure 5:
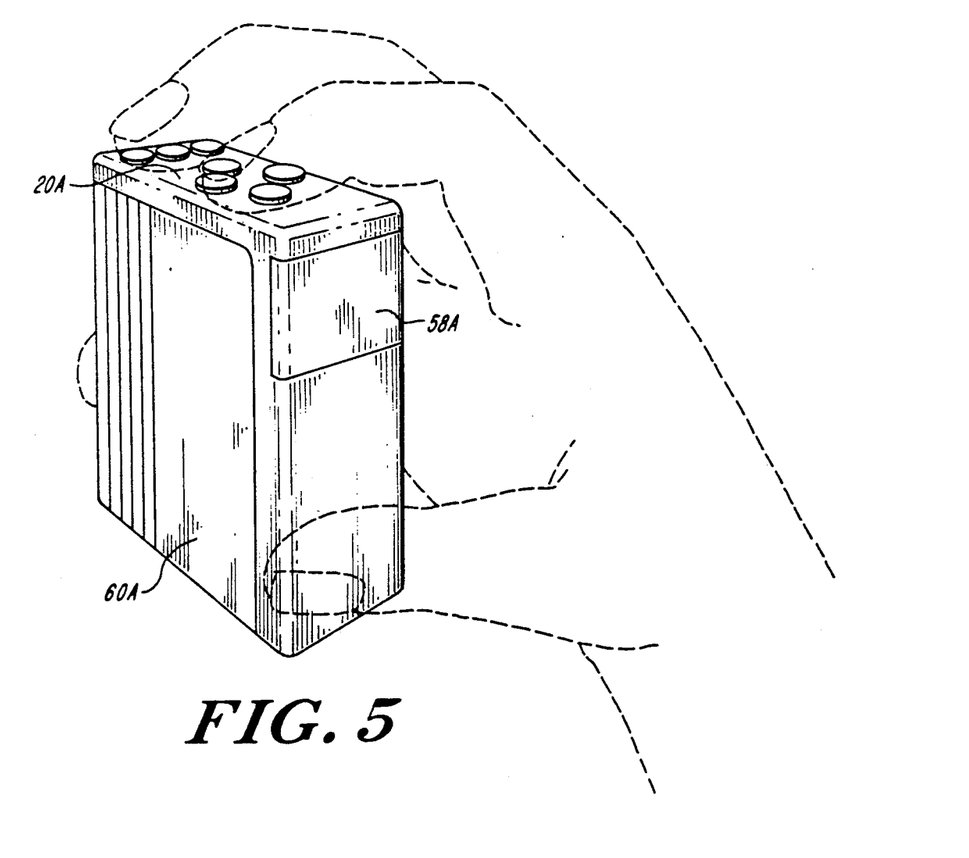
FIG. 5 is a perspective view of of the present invention illustrating a first case design and positioning within the user's hand which is shown in phantom.

FIG. 5 illustrates a first housing embodiment in which case 60A has an elongated rectangular shape. In this embodiment, case 60A completely surrounds the elements of the miniature video display system 40 preventing ambient light from the user's environment from permeating the case except for a single opening, display window 58A, from which the virtual image produced by the display 40 can be viewed. In the present housing embodiment, the display 40 is positioned vertically within case 60A so that the virtual image viewed through display window 58A is taller than it is wide, like a sheet of paper. In this embodiment, display window 58A has a height along the Y-axis of approximately 1 inch and a width along the X-axis of approximately ¾ of an inch. Also, case 60A has a height along the Y-axis of approximately 3½ inches, a width along the X-axis of approximately 1 inch, and a depth along the Z-axis of approximately 2½ inches. In the preferred embodiment, display window 58A may be comprised of glass, plexiglass or clear plastic. Case 60A is comprised of a light weight, yet durable material such as injection molded plastic. In this embodiment, the keys comprising keyboard 20A are positioned on the top of case 60A. The number and positioning of the keys of keyboard 20A is determined by the number of selectable functions and the designer's preference.

Figure 6:
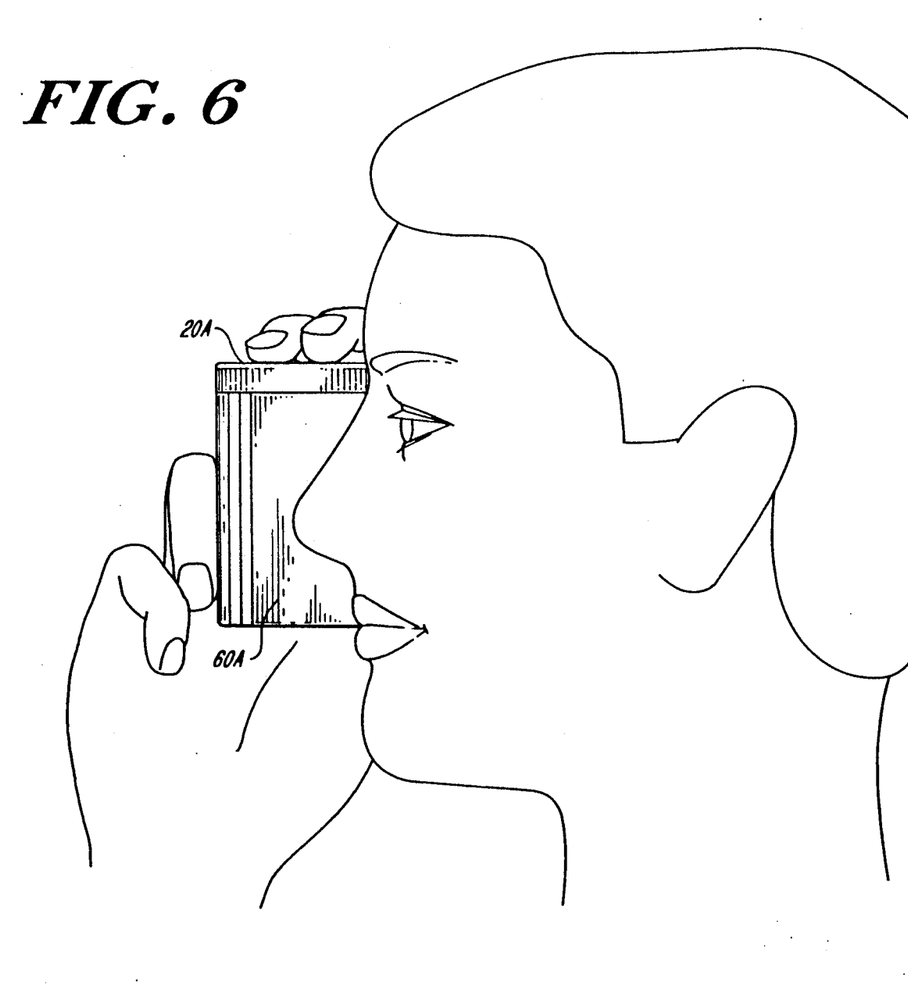
FIG. 6 is a side view of the case design of FIG. 5 as held by the user for viewing purposes.

The present housing embodiment is particularly well suited for the embodiment of data receivers 10A and 10B in which the dialing capability is implemented via cursor selection from a "menu" on the display FIG. 6 illustrates a user utilizing a data receiver 10 having the first housing embodiment described above. The user grasps case 60A in the palm of his hand so that at least one finger is resting on keyboard 20A. The case 60A is then brought within close proximity to the desired viewing eye so that display window 58A is approximately 1 inch from the user's eye for viewing of the full page raster image. A focus control (not shown) is provided for focus adjustment of the displayed image to suit user prefrence. The user then manipulates the keys of keyboard 20A for the desired function.

Figure 7:
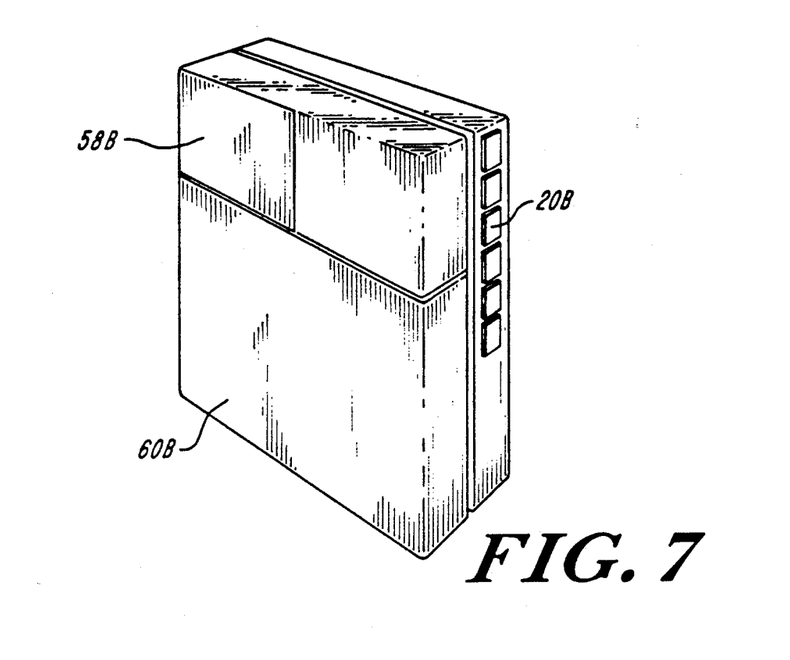
FIG. 7 is a rear perspective view of a second case design in which the raster display is positioned at an angle along the side of the case.

FIG. 7 illustrates a second housing embodiment which is similar in size and shape to that shown in FIG. 5. In the second embodiment, however, the miniature display 40 is positioned horizontally across the top of case 60B, and keyboard 20B is arranged vertically along the side of case 60B. In this second housing embodiment, display window 58 is likewise mounted horizontally and has dimensions so that the screen is wider than high as with a normal computer monitor. The positioning and operation of this embodimet is similar to that shown in FIGS. 5 and 6 and is similarily suited for the functional designs of data receivers 10A and 10B.

Figure 8:
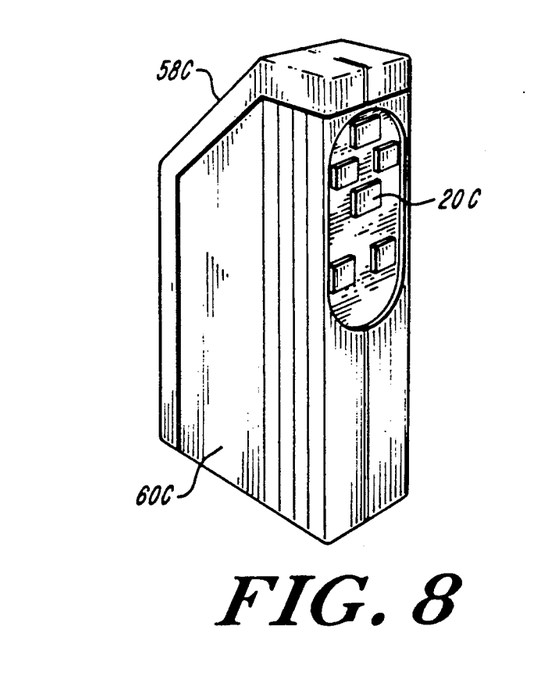
FIG. 8 is a side view of the second case design of FIG. 5 as held by the user for viewing purposes.

FIG. 8 show yet a third housing embodiment of data receiver 10. In this embodiment, case 60C is slightly longer and narrower than case 60A or 60B. As with the first housing embodiment, the miniature video display 40 is positioned vertically within case 60C, however, viewing window 58C, not visible in FIG. 8, is positioned at an angle to enable easier holding by the viewer. The keys comprising keyboard 20C of this embodiment are positioned along the back of case 60C.

Figure 9:
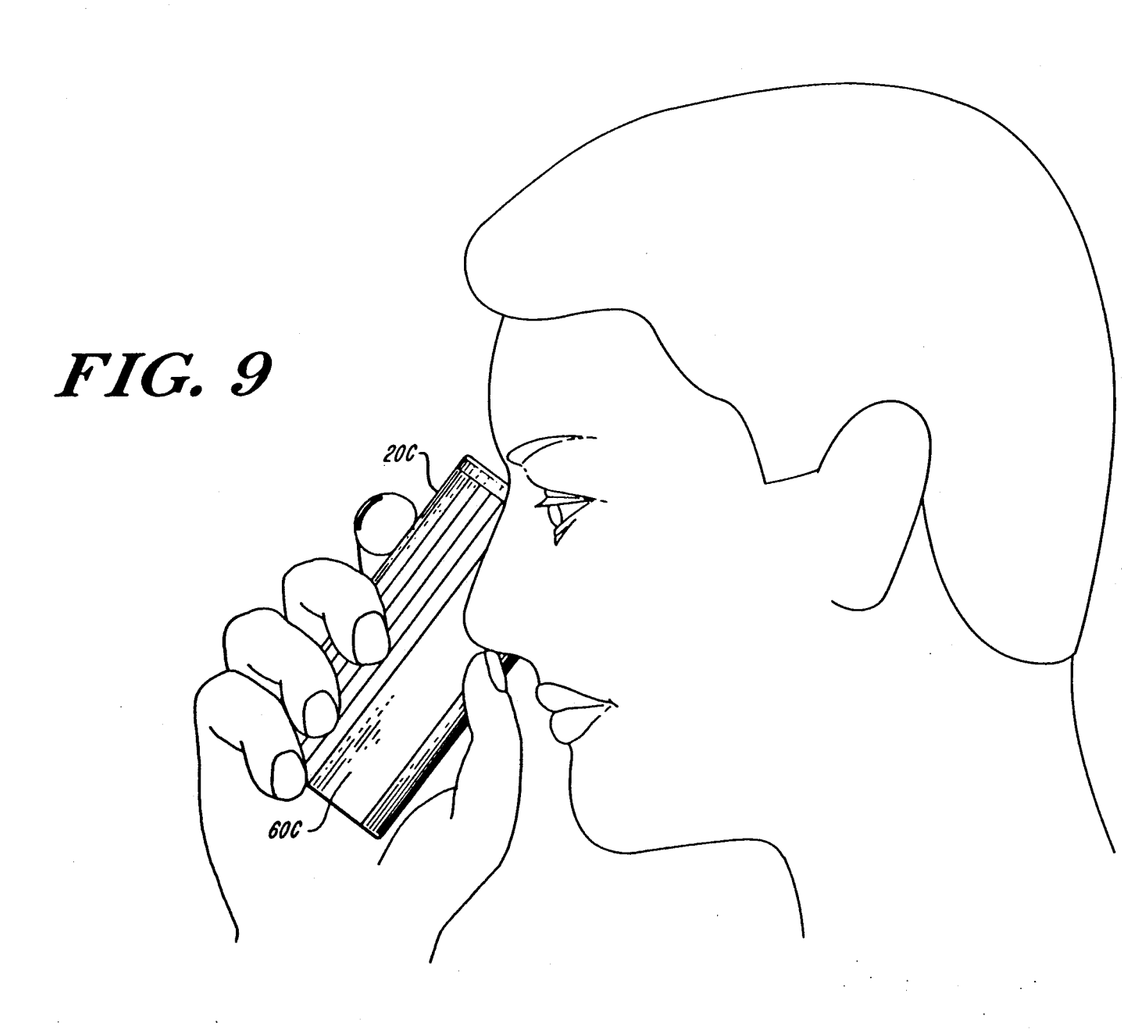
FIG. 9 is a perspective view of a third case design in which the raster display is horizontally mounted across the front of the device.

FIG. 9 illustrates a user utilizing a data receiver 10 with the housing embodiment shown in FIG. 8. The positioning and operation of this embodiment is similar to that shown in FIG. 6, however, when display window 58C, not shown in FIG. 9, is perpendicular to the users line of sight, case 60C rests at a comfortable angle within the user's hand. This particular housing embodiment allows the user easier access to keyboard 20C on the rear of case 60C and causes less finger and hand fatigue an over extended viewing period.

The housing embodiments outlined above may be used in conjunction with any of the functional embodiments of data receivers 10A, 10B, or 10C and should not be restricted to the combinations suggested above.

Having thus described one particular embodiment, various alterations, modifications and improvements will readily occur to those skilled in the art. Such alterations, modifications and improvements as are made obvious by this disclosure are intended to be part of this disclosure though not expressly stated herein, and are intended to be in the spirit and scope of the invention. Accordingly, the foregoing description is intended to be exemplary only and not limiting. The invention is limited only as defined in the following claims and equivalents thereto.

What is claimed is:

1. A pocket-size data receiver comprised of:
signal receiving means arranged to receive signals representing data;
signal processing means arranged to process signals from the signal receiving means;
a means for selectively controlling the operation of said data receiver, and, in particular, the display of said data;
display means, responsive to said data, for generating a magnified, virtual-image visual data display comprised of a number of picture elements, said display means comprising a number of light-emitting elements wherein said number of light-emitting elements is less than said number of picture elements; and
a pocket-size housing enclosing said signal receiving means, said signal processing means, said controlling means and said display means.

2. The data receiver of claim 1 wherein said magnified, virtual-image visual data display means is capable of displaying a two-dimensional image.

3. The data receiver of claim 2 wherein said two-dimensional magnified, virtual-image visual data display is capable of displaying at least 1900 characters of text simultaneously.

4. The data receiver of any one of claims 1-3 further comprised of a data storage mean capable of storing data received by said signal receiving means and processed by said signal processing means.

5. The data receiver of any one of claims 1-3 further comprised of a control processor which in conjunction with said controlling means enables functional control over said data receiver.

6. The data receiver of any one of claims 1-3 further comprised of a data transmission means for enabling the transmission of data received by said data receiver.

7. A pocket-size data receiver comprised of:
signal receiving means arranged to receive signals representing data;
signal processing means arranged to process signals from the signal receiving means;
a keyboard means for selectively controlling the operation of said data receiver, and, in particular, the display of said data; and
display means responsive to said data for generating a magnified, virtual line image of said data, said display means comprised of a number of light-emitting elements;
conversion means for converting said line image into a two-dimensional virtual image comprised of a number of picture elements, said number of picture elements being greater than said number of light-emitting elements; and
a pocket-size housing enclosing said signal receiving means, said signal processing means, said keyboard means, said display means and said conversion means.

8. A data receiver according to claim 7 wherein said conversion means comprises an oscillating mirror.

9. The data receiver of claim 7 wherein said display means further comprises means responsive to said data for converting said data into digital signals and means responsive to said digital signals for selectively illuminating said light-emitting elements.

10. The data receiver of claim 7 wherein said display means is comprised of a sufficient number of light-emitting elements so that at least 80 text characters can be simultaneously displayed.

11. The data receiver of claim 9 wherein said display means further comprises an optical system for generating said magnified, virtual image from said light-emitting elements.

12. The data receiver of claim 10 wherein said conversion means comprises an oscillating mirror for reflecting said magnified, virtual image of said light-emitting elements.

13. A pocket-size data receiver comprised of:
signal receiving means arranged to receive signals representing data;
signal processing means arranged to process signals from the signal receiving means;
a keyboard means for selectively controlling the display of information and operation of said data receiver;
a data storage means for retaining data which has been received by said signal receiving means and processed by said signal processing means;
a processor unit which in conjunction with said keyboard means enables the functional control of said data receiver
a line of light-emitting devices;
means responsive to said stored data for selectively illuminating said light-emitting devices;
an optical system for generating a magnified, virtual image of said line of light-emitting devices; and
an oscillating mirror for reflecting said magnified, virtual image of said line of light-emitting devices to create a two-dimensional magnified virtual image of said data; and,
a pocket-size housing enclosing said signal receiving means, said signal processing means, said keyboard means, said data storage means, said processor unit, said line of light emitting devices, said optical system, said oscillating mirror, and said means responsive to said stored data.

14. A data receiver of claim 13 wherein said oscillating mirror is resonantly driven.

15. The data receiver of claim 14 wherein said light-emitting devices are light-emitting diodes.

16. The data receiver of claim 15 wherein said optical system comprises at least one lens located between said line of light-emitting diodes and said oscillating mirror.

17. The data receiver of claim 16 wherein said line of light-emitting diodes includes a sufficient number of diodes and said oscillating mirror oscillates over a sufficient angle that a user of said data receiver can view at least 1900 text characters simultaneously.

18. The data receiver of any of claims 1, 7 or 13 in which said signal receiving means is comprised of a conventional antenna in conjunction with a radio receiver which includes frequency shift key demodulator circuitry.

19. The data receiver of any of claims 1, 7 or 13 in which said signal processing means is comprised of a universal asynchronous receiver/transmitter for converting data into the proper digital format.

20. The data receiver of any of claims 1, 7 or 13 in which said signal receiving means is comprised of a telephone connector and a data access arrangement for providing a transformer connection to a telephone line.

21. The data receiver according to any of claims 1, 7 or 13 in which said signal processing means is comprised of a modem for providing modulator/demodulator functions for converting analog signals to digital signals representing data.

* * * * *